US012790995B2

(12) United States Patent
Sibbach et al.

(10) Patent No.: US 12,790,995 B2
(45) Date of Patent: Nov. 10, 2026

(54) GAS TURBINE ENGINE WITH THIRD STREAM

(71) Applicant: General Electric Company, Schenectady, NY (US)

(72) Inventors: Arthur William Sibbach, Boxford, MA (US); Jeffrey Donald Clements, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/987,299

(22) Filed: Nov. 15, 2022

(65) Prior Publication Data

US 2024/0159191 A1 May 16, 2024

(51) Int. Cl.

*F02K 3/072* (2006.01)
*F02C 3/06* (2006.01)
(Continued)

(52) U.S. Cl.

CPC ................ *F02K 3/072* (2013.01); *F02C 3/06* (2013.01); *F02C 6/206* (2013.01); *F02K 3/06* (2013.01);
(Continued)

(58) Field of Classification Search

CPC . F02K 3/072; F02K 3/077; F02K 3/06; F02K 3/062; F02K 3/065; F02C 3/10; F02C 3/06; F02C 3/107; F02C 3/113; F02C 3/067; F02C 6/206; F05D 2220/36; F05D 2220/44
See application file for complete search history.

(56) References Cited

U.S. PATENT DOCUMENTS 2,999,630 A 9/1961 Warren et al.
3,528,250 A 9/1970 Johnson
(Continued)

FOREIGN PATENT DOCUMENTS

CN 1204005 A 1/1999
CN 101657607 A 2/2010
(Continued)

OTHER PUBLICATIONS

Crigler, Application of Theodorsen's Theory to Propeller Design, NACA (National Advisory Committee for Aeronautics) Report 924, 1948, pp. 83-99.
(Continued)

*Primary Examiner* — Gerald L Sung
*Assistant Examiner* — Jingchen Liu
(74) *Attorney, Agent, or Firm* — Dority & Manning, P.A.

(57) ABSTRACT

A gas turbine engine may include a turbomachine including a compressor section, a combustion section, and a turbine section arranged in serial flow order. The turbomachine defines an engine inlet to an inlet duct, a fan duct inlet to a fan duct, and a core inlet to a core duct. A primary fan is drivingly coupled to the turbomachine, and a secondary fan assembly is disposed downstream of the primary fan within the inlet duct. The secondary fan assembly includes a first secondary fan drivingly coupled to the turbomachine in a first rotational direction, and a second secondary fan drivingly coupled to the turbomachine in a second rotational direction opposite the first rotational direction.

13 Claims, 9 Drawing Sheets

(51) Int. Cl.

| | |
|---|---|
| ***F02C 6/20*** | (2006.01) |
| ***F02K 3/06*** | (2006.01) |
| ***F02K 3/077*** | (2006.01) |

(52) U.S. Cl.

CPC .......... *F02K 3/077* (2013.01); *F05D 2220/36* (2013.01); *F05D 2250/44* (2013.01)

(56) References Cited

U.S. PATENT DOCUMENTS

| | | | | |
|---|---|---|---|---|
| 3,540,682 | A | 11/1970 | Dibble et al. | |
| 3,542,152 | A | 11/1970 | Adamson et al. | |
| 3,750,402 | A | 8/1973 | Vdoviak et al. | |
| 4,010,608 | A | 3/1977 | Simmons | |
| 4,043,121 | A | 8/1977 | Thomas et al. | |
| 4,064,692 | A * | 12/1977 | Johnson .................. | F02K 3/077 60/762 |
| 4,446,696 | A | 5/1984 | Sargisson et al. | |
| 4,486,146 | A | 12/1984 | Campion | |
| 4,569,199 | A | 2/1986 | Klees et al. | |
| 4,607,657 | A | 8/1986 | Hirschkron | |
| 4,784,575 | A | 11/1988 | Nelson et al. | |
| 4,860,537 | A | 8/1989 | Taylor | |
| 4,892,269 | A | 1/1990 | Greco et al. | |
| 4,907,946 | A | 3/1990 | Ciokajlo et al. | |
| 4,916,894 | A | 4/1990 | Adamson et al. | |
| 4,976,102 | A | 12/1990 | Taylor | |
| 5,054,998 | A | 10/1991 | Davenport | |
| 5,190,441 | A | 3/1993 | Murphy et al. | |
| 5,197,855 | A | 3/1993 | Magliozzi et al. | |
| 5,259,187 | A | 11/1993 | Dunbar et al. | |
| 5,261,227 | A | 11/1993 | Giffin, III | |
| 5,345,760 | A | 9/1994 | Giffin, III | |
| 5,457,346 | A | 10/1995 | Blumberg et al. | |
| 5,950,308 | A | 9/1999 | Koff et al. | |
| 6,339,927 | B1 * | 1/2002 | DiPietro, Jr. ........... | F02K 3/072 60/39.162 |
| 6,547,518 | B1 | 4/2003 | Czachor et al. | |
| 6,763,654 | B2 | 7/2004 | Orlando et al. | |
| 6,792,758 | B2 | 9/2004 | Dowman | |
| 7,559,191 | B2 | 7/2009 | Parks | |
| 7,658,063 | B1 | 2/2010 | Matheny | |
| 7,762,766 | B2 | 7/2010 | Shteyman et al. | |
| 8,256,202 | B1 | 9/2012 | Paulino | |
| 8,276,392 | B2 | 10/2012 | van der Woude | |
| 8,382,430 | B2 | 2/2013 | Parry et al. | |
| 8,459,035 | B2 | 6/2013 | Smith et al. | |
| 8,689,538 | B2 | 4/2014 | Sankrithi et al. | |
| 8,762,766 | B2 | 6/2014 | Ferguson et al. | |
| 8,876,465 | B2 | 11/2014 | Stretton | |
| 8,910,465 | B2 | 12/2014 | Snyder | |
| 8,943,796 | B2 | 2/2015 | McCaffrey | |
| 8,967,967 | B2 | 3/2015 | Stretton et al. | |
| 9,017,028 | B2 | 4/2015 | Fabre | |
| 9,045,996 | B2 | 6/2015 | Anghel et al. | |
| 9,057,328 | B2 | 6/2015 | Kupratis | |
| 9,096,312 | B2 | 8/2015 | Moxon | |
| 9,097,134 | B2 | 8/2015 | Ferch et al. | |
| 9,534,538 | B1 | 1/2017 | Cerny | |
| 9,677,501 | B2 | 6/2017 | Pierluissi et al. | |
| 9,759,160 | B2 | 9/2017 | Sankrithi et al. | |
| 9,845,768 | B2 | 12/2017 | Pesyna et al. | |
| 9,982,555 | B2 | 5/2018 | Thet et al. | |
| 9,995,314 | B2 | 6/2018 | Miller et al. | |
| 10,077,660 | B2 | 9/2018 | Hoefer et al. | |
| 10,090,676 | B2 | 10/2018 | Knowles et al. | |
| 10,126,062 | B2 | 11/2018 | Cerny et al. | |
| 10,184,400 | B2 | 1/2019 | Cerny et al. | |
| 10,202,865 | B2 | 2/2019 | Breeze-Stringfellow et al. | |
| 10,253,648 | B2 | 4/2019 | Bentley et al. | |
| 10,260,419 | B2 | 4/2019 | Cerny et al. | |
| 10,263,550 | B2 | 4/2019 | Thet et al. | |
| 10,344,674 | B2 | 7/2019 | Cerny et al. | |
| 10,364,750 | B2 | 7/2019 | Rambo | |
| 10,443,436 | B2 | 10/2019 | Miller et al. | |
| 10,487,739 | B2 | 11/2019 | Miller et al. | |
| 10,644,630 | B2 | 5/2020 | Smith et al. | |
| 10,787,996 | B2 | 9/2020 | Kupratis et al. | |
| 2004/0197187 | A1 | 10/2004 | Usab et al. | |
| 2004/0234372 | A1 | 11/2004 | Shahpar | |
| 2005/0109012 | A1 | 5/2005 | Johnson | |
| 2005/0241292 | A1 * | 11/2005 | Taylor ....................... | F01D 1/26 60/791 |
| 2007/0186535 | A1 | 8/2007 | Powell et al. | |
| 2007/0251212 | A1 | 11/2007 | Tester | |
| 2009/0078819 | A1 | 3/2009 | Guering et al. | |
| 2010/0014977 | A1 | 1/2010 | Shattuck | |
| 2010/0111674 | A1 | 5/2010 | Sparks | |
| 2010/0251726 | A1 | 10/2010 | Jones et al. | |
| 2010/0326050 | A1 * | 12/2010 | Schilling ................ | H02K 16/02 60/268 |
| 2010/0329856 | A1 | 12/2010 | Hofer et al. | |
| 2011/0120083 | A1 * | 5/2011 | Giffin ...................... | F02K 3/077 60/226.3 |
| 2011/0150659 | A1 | 6/2011 | Micheli et al. | |
| 2011/0192166 | A1 | 8/2011 | Mulcaire | |
| 2012/0177493 | A1 | 7/2012 | Fabre | |
| 2013/0098050 | A1 | 4/2013 | Kupratis | |
| 2013/0104521 | A1 | 5/2013 | Kupratis | |
| 2013/0104522 | A1 | 5/2013 | Kupratis | |
| 2013/0104560 | A1 | 5/2013 | Kupratis | |
| 2014/0133982 | A1 | 5/2014 | Dejeu et al. | |
| 2014/0345253 | A1 | 11/2014 | Dawson et al. | |
| 2014/0345254 | A1 | 11/2014 | Dawson et al. | |
| 2015/0003993 | A1 | 1/2015 | Kim et al. | |
| 2015/0098813 | A1 | 4/2015 | Jarrett, Jr. | |
| 2015/0121893 | A1 | 5/2015 | Kupratis | |
| 2015/0284070 | A1 | 10/2015 | Breeze-Stringfellow et al. | |
| 2015/0291276 | A1 | 10/2015 | Zatorski et al. | |
| 2016/0010487 | A1 | 1/2016 | Breeze-Stringfellow et al. | |
| 2016/0053692 | A1 | 2/2016 | Izquierdo | |
| 2016/0090863 | A1 | 3/2016 | Diaz et al. | |
| 2016/0102607 | A1 * | 4/2016 | Hiernaux ................ | F02C 3/067 415/69 |
| 2016/0160647 | A1 | 6/2016 | Hofer et al. | |
| 2016/0230658 | A1 | 8/2016 | Hanlon et al. | |
| 2016/0298550 | A1 | 10/2016 | Kupratis et al. | |
| 2016/0333734 | A1 | 11/2016 | Bowden et al. | |
| 2016/0347463 | A1 | 12/2016 | Negulescu | |
| 2017/0051678 | A1 | 2/2017 | Becker, Jr. | |
| 2017/0051680 | A1 | 2/2017 | Becker, Jr. et al. | |
| 2017/0102006 | A1 | 4/2017 | Miller et al. | |
| 2017/0114721 | A1 | 4/2017 | Miller et al. | |
| 2017/0167382 | A1 | 6/2017 | Miller et al. | |
| 2017/0184027 | A1 | 6/2017 | Moniz et al. | |
| 2017/0198719 | A1 | 7/2017 | Cerny et al. | |
| 2018/0065727 | A1 | 3/2018 | Gruber et al. | |
| 2018/0118364 | A1 | 5/2018 | Golshany et al. | |
| 2018/0187600 | A1 * | 7/2018 | Moniz ....................... | F02K 3/06 |
| 2018/0215475 | A1 | 8/2018 | Hurt et al. | |
| 2018/0283795 | A1 | 10/2018 | Cerny et al. | |
| 2019/0136710 | A1 | 5/2019 | Breeze-Stringfellow et al. | |
| 2019/0153952 | A1 | 5/2019 | Niergarth et al. | |
| 2019/0153953 | A1 | 5/2019 | Niergarth et al. | |
| 2019/0218971 | A1 | 7/2019 | Niergarth et al. | |
| 2019/0249599 | A1 | 8/2019 | Sen et al. | |
| 2019/0257247 | A1 | 8/2019 | Pal et al. | |
| 2019/0360401 | A1 | 11/2019 | Rambo et al. | |
| 2020/0025109 | A1 | 1/2020 | Stieger et al. | |
| 2020/0095939 | A1 | 3/2020 | Epstein | |
| 2020/0116104 | A1 | 4/2020 | Levisse et al. | |
| 2020/0332718 | A1 | 10/2020 | Rambo | |
| 2021/0108573 | A1 | 4/2021 | Sibbach et al. | |
| 2021/0108595 | A1 | 4/2021 | Khalid et al. | |
| 2021/0108597 | A1 * | 4/2021 | Ostdiek ................... | F02C 6/206 |

FOREIGN PATENT DOCUMENTS

| | | | |
|---|---|---|---|
| DE | 1081277 | B | 5/1960 |
| EP | 0385913 | A1 | 9/1990 |
| EP | 0887259 | A2 | 12/1998 |
| EP | 1493900 | A2 | 1/2005 |
| EP | 1988274 | A2 | 11/2008 |

(56) References Cited

FOREIGN PATENT DOCUMENTS

| | | | |
|---|---|---|---|
| EP | 2540989 | A2 | 1/2013 |
| EP | 2562082 | A2 | 2/2013 |
| EP | 3093443 | A1 | 11/2016 |
| GB | 2100799 | A | 1/1983 |
| GB | 2196390 | A | 4/1988 |
| GB | 2461811 | A | 1/2010 |
| JP | H0370698 | A | 3/1991 |
| JP | 2006123880 | A | 5/2006 |
| JP | 2009508748 | A | 3/2009 |
| JP | 2011527263 | A | 10/2011 |
| KR | 101179277 | B1 | 9/2012 |
| WO | WO2004/033295 | A1 | 4/2004 |
| WO | WO2005/111413 | A1 | 11/2005 |
| WO | WO2011/020458 | A2 | 2/2011 |
| WO | WO2011/094477 | A2 | 8/2011 |
| WO | WO2011/107320 | A1 | 9/2011 |
| WO | WO2014/143248 | A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. http://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference And Exhibit, Jul. 6-8, 1992, Nashville TN, pp. 1-9.

* cited by examiner

GAS TURBINE ENGINE WITH THIRD STREAM

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
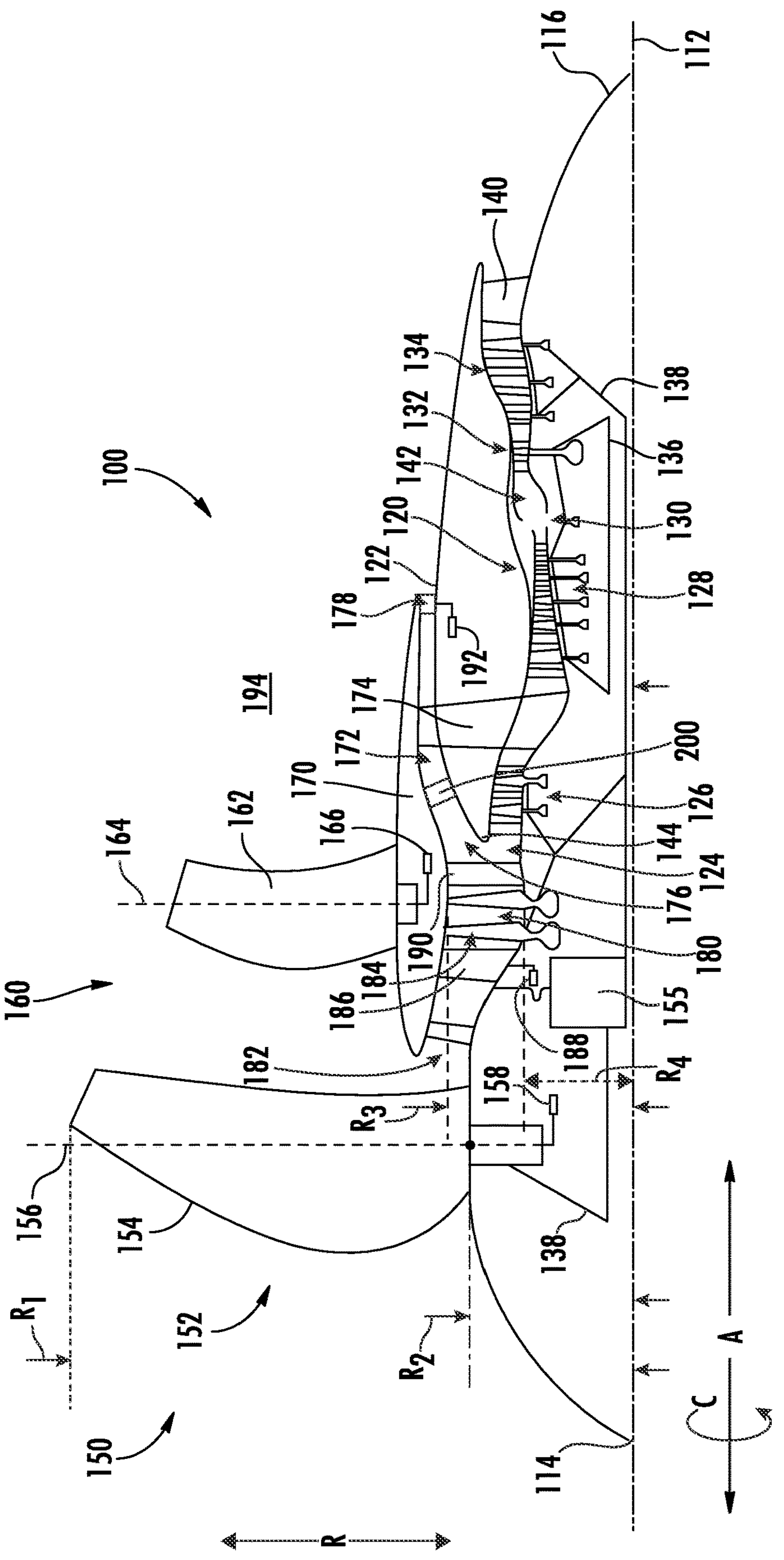
FIG. 1 is a schematic sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

As used herein, the terms “first”, “second”, and “third” may be used interchangeably to distinguish one component from another and are not intended to signify location or importance of the individual components.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “coupled,” “fixed,” “attached to,” and the like refer to both direct coupling, fixing, or attaching, as well as indirect coupling, fixing, or attaching through one or more intermediate components or features, unless otherwise specified herein.

The singular forms “a”, “an”, and “the” include plural references unless the context clearly dictates otherwise.

The phrases “from X to Y” and “between X and Y” each refers to a range of values inclusive of the endpoints (i.e., refers to a range of values that includes both X and Y).

A “third stream” as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "disk loading" refers to an average pressure change across a plurality of rotor blades of a rotor assembly, such as the average pressure change across a plurality of fan blades of a fan.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

Generally, a turbofan engine includes a fan to provide a desired amount of thrust without overloading the fan blades (i.e., without increasing a disk loading of the fan blades of the fan beyond a certain threshold), and therefore to maintain a desired overall propulsive efficiency for the turbofan engine. Conventional turbofan engine design practice has been to provide an outer nacelle surrounding the fan to provide relatively efficient thrust for the turbofan engine. Such a configuration may generally limit a permissible size of the fan (i.e., a diameter of the fan). However, the inventors of the present disclosure have found that turbofan engine design is now driving the diameter of the fan higher to provide as much thrust for the turbofan engine as possible from the fan to improve an overall propulsive efficiency of the turbofan engine.

By increasing the fan diameter, an installation of the turbofan engine becomes more difficult. In addition, if an outer nacelle is maintained, the outer nacelle may become weight prohibitive with some larger diameter fans. Further, as the need for turbofan engines to provide more thrust continues, the thermal demands on the turbofan engines correspondingly increase.

The inventors of the present disclosure found that for a three-stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly may in fact increase the overall propulsive efficiency of the gas turbine engine.

Furthermore, the inventors of the present disclosure have found that a compact, lightweight, and efficient secondary fan (also referred to as a mid-fan) arrangement can be provided for a three-stream gas turbine engine by providing a counter rotating arrangement of a first secondary fan and a second secondary fan. This arrangement facilitates favorable flow characteristics with a simple and compact mid-fan construction, eliminating or reducing the need for intermediate structures, and further facilitates simple and compact arrangements of downstream components in the turbomachine and the shafts or spools used to connect therebetween.

Referring now to FIG. 1, a schematic sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_1$ divided by $R_2$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, drivingly coupled to and driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_3$ divided by $R_4$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The ducted fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
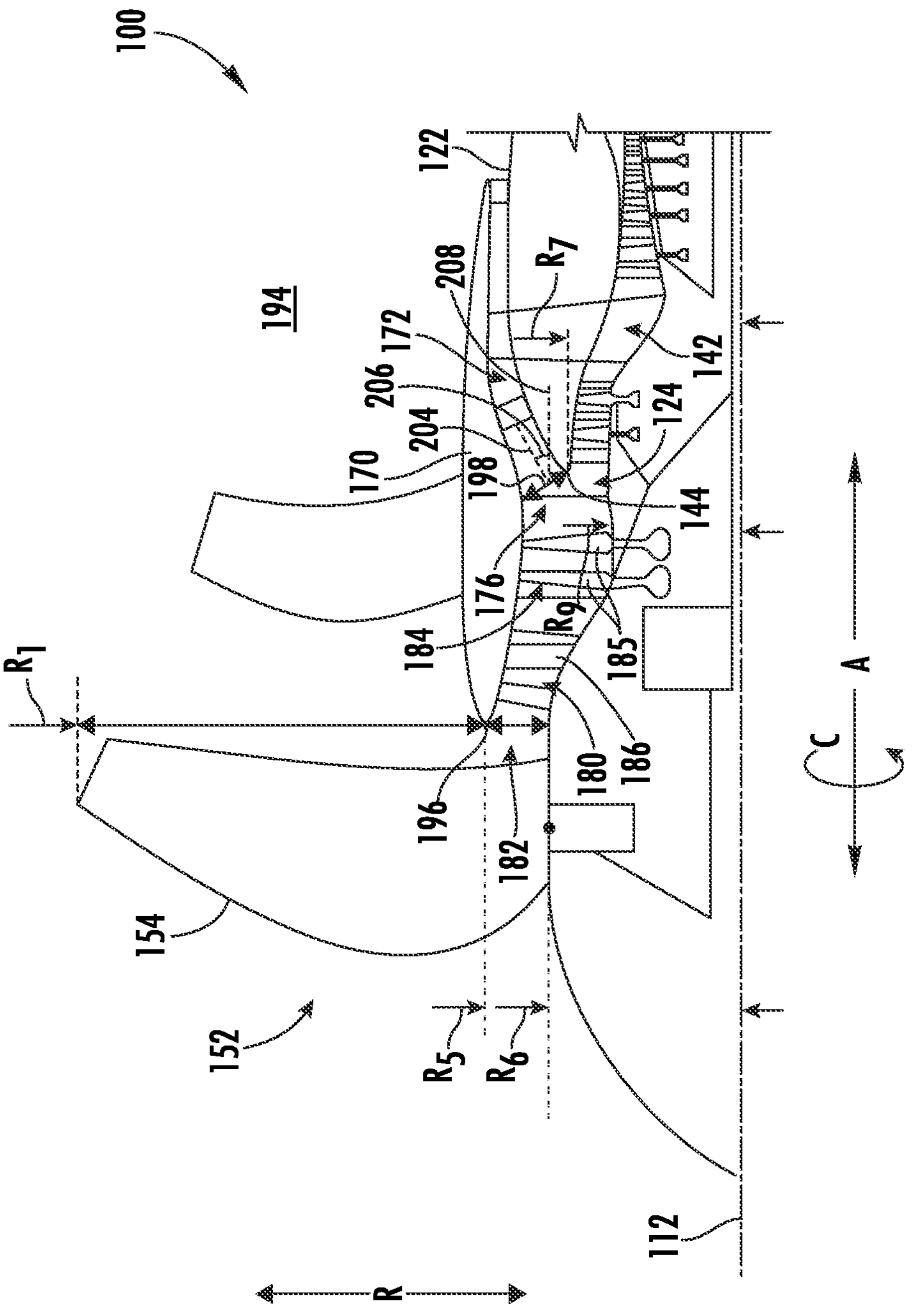
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above includes a primary fan, or rather fan 152 having fan blades 154, and a secondary fan, or rather ducted fan 184 having fan blades 185. Airflow from the fan 152 is split between a bypass passage 194 and the inlet duct 180 by an inlet splitter 196. Airflow from the ducted fan 184 is split between the fan duct 172 and the core duct 142 by the leading edge 144, which may also be referred to as a fan duct splitter.

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$. The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula:

$$\pi R_1^2 - \pi R_5^2.$$

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula:

$$\pi R_5^2 - \pi R_6^2.$$

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
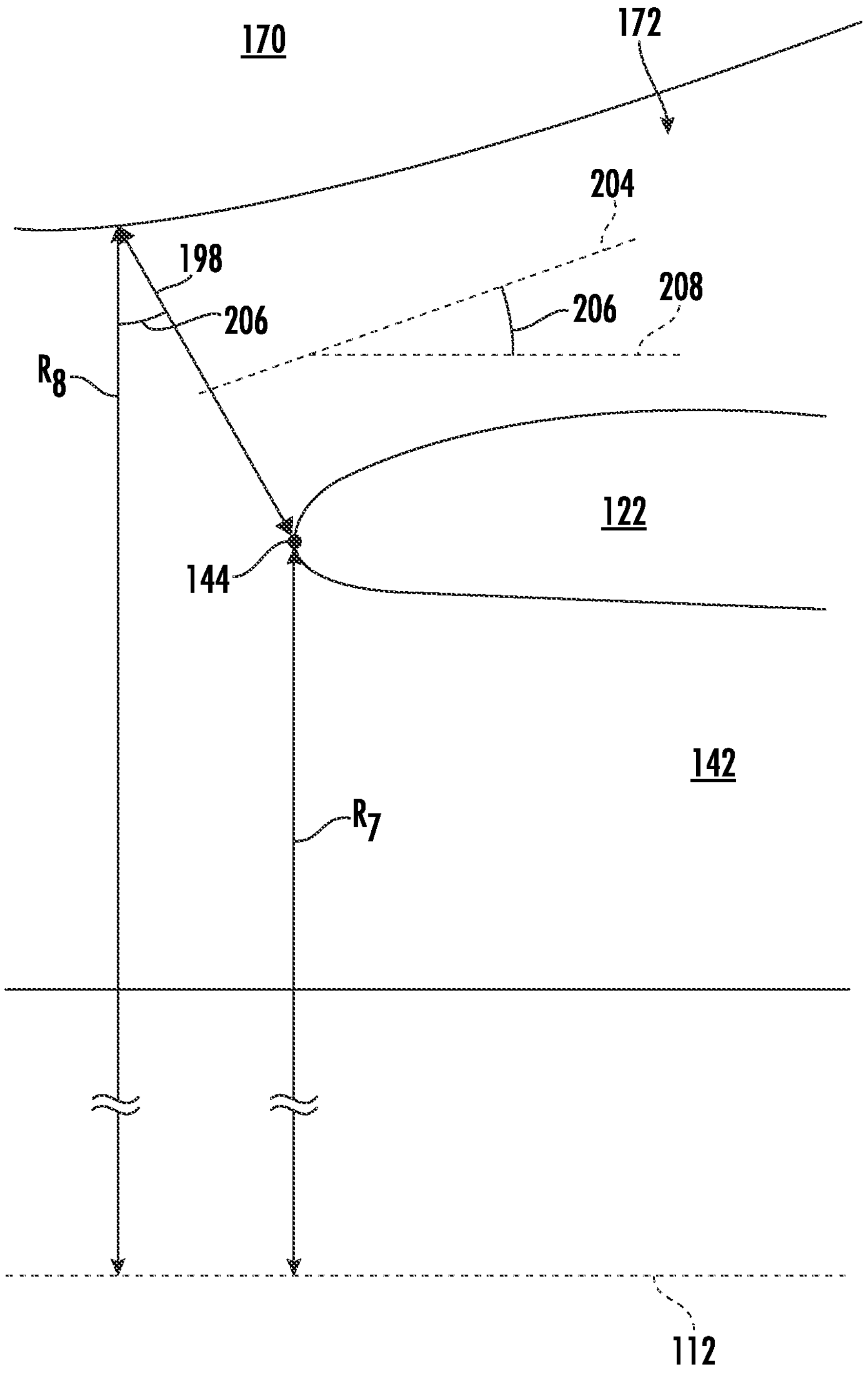
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi(R_8^2 - R_7^2)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula:

$$\pi R_7^2 - \pi R_9^2.$$

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. The exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage 194 of the engine 100 and through the fan duct 172 to an airflow through the core duct 142. Further, the core bypass ratio is a ratio of an airflow through the fan duct 172 to the airflow through the core duct 142. These ratios relate to propulsive characteristics of the engine 100 while operating at a rated speed during standard day operating conditions. The airflow amounts used to calculate these ratios are expressed as a mass flowrate in the same units (mass per unit time).

More specifically, the amount of the airflow through the bypass passage 194 is determined using a fan pressure ratio for the fan 152 while operating at the rated speed during standard day operating conditions, and the primary fan outer fan area, $A_{P\_Out}$. The amount of airflow through the inlet duct 180 is determined using a fan pressure ratio for the fan 152 while operating at a rated speed during standard day operating conditions, and the primary fan inner fan area, $A_{P\_In}$. The amount of airflow through the fan duct 172 and the amount of airflow through the core duct 142 is determined based on the amount of airflow through the inlet duct 180 and the secondary fan outer fan area, $A_{S\_Out}$, and the secondary fan inner fan area, $A_{S\_In}$.

Figure 4:
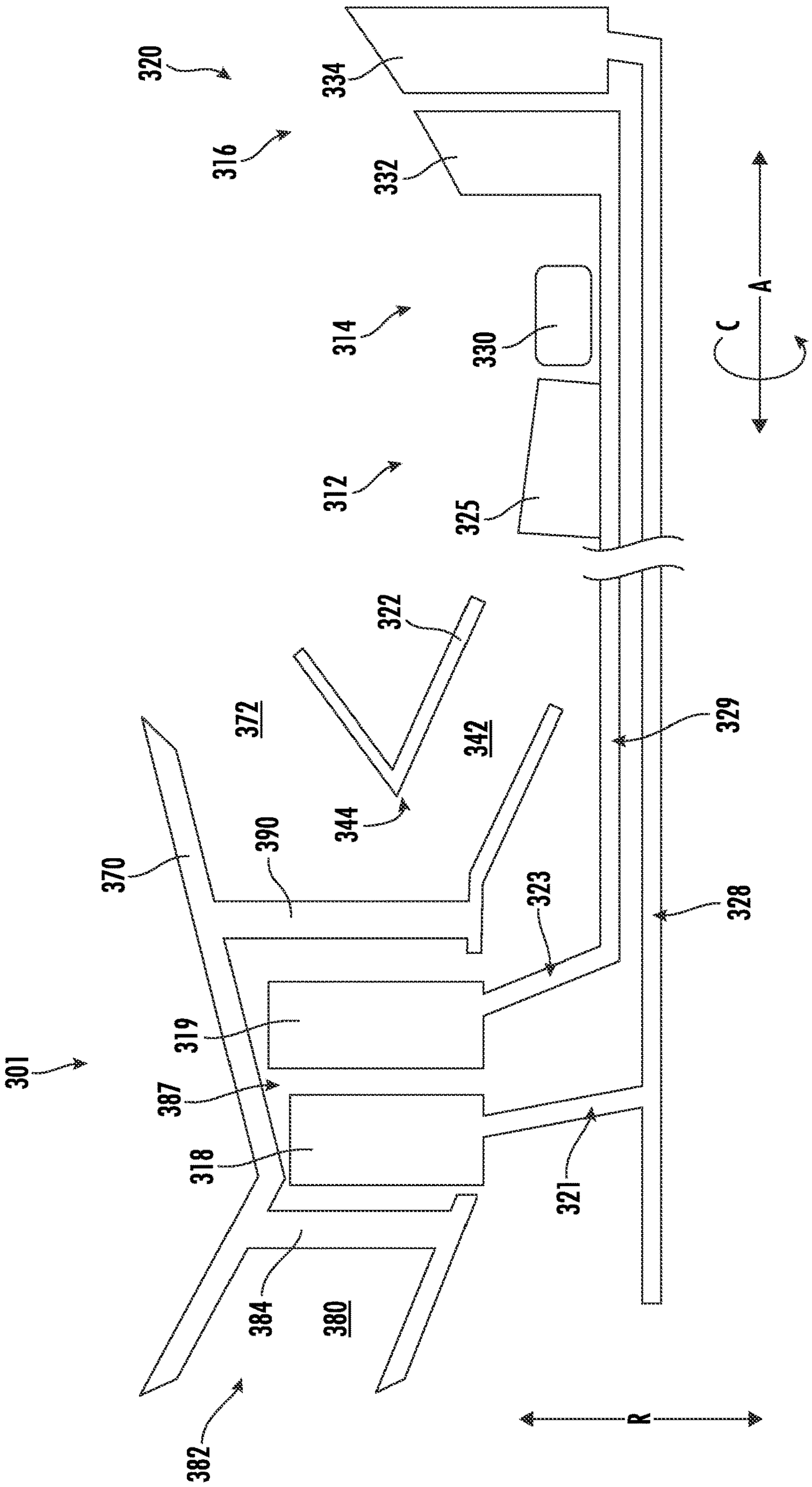
FIG. 4 is a schematic sectional view of a mid-fan arrangement for a three-stream engine according to an embodiment.

Referring now to FIG. 4, a schematic sectional view of a mid-fan arrangement 301 for a three-stream engine is depicted. It should be appreciated that such a mid-fan arrangement 301 may be employed with various embodiments of three-stream engines, including those described with reference to FIGS. 1-3 and 8-11. A mid-fan arrangement 301 may generally be used to refer to a secondary fan assembly 387, for example as described above in FIG. 1 with reference to the ducted fan 184. As shown in FIG. 4, the secondary fan assembly 387 includes at least two secondary fans, depicted here as a first secondary fan 318 and a second secondary fan 319. As with other embodiments described herein, flow through the secondary fan assembly 387 may be controlled by various features including inlet guide vanes 384 and outlet guide vanes 390. Thus, flow entering through an engine inlet 382 into an inlet duct 380 may be controlled into the secondary fan assembly 387 by the inlet guide vanes 384. Flow exiting from the secondary fan assembly 387 may be controlled by the outlet guide vanes 390.

Flow provided to the mid-fan arrangement 301 is at least partly motivated by a primary fan arrangement (not shown, see fan section 150 of FIG. 1 and rotor 502 of FIGS. 8-11). Additional flow may of course be derived from other sources such as airspeed of the engine or aircraft. Secondary fan assembly 387 of the mid-fan arrangement 301 further motivates flow through the engine by creating a pressure differential with rotating airfoils. As alluded to above, rotating airfoils can create problems such as swirl and turbulence, often requiring additional structures and complexity to overcome these problems. For example, aerodynamic turning surfaces such as stators are often disposed between stages of rotating airfoils to reduce circumferential flow. However, the embodiments described herein present a mid-fan arrangement 301 designed to efficiently handle flow and produce thrust in a simple and lightweight manner.

The mid-fan arrangement 301 of FIG. 4 includes the secondary fan assembly 387 disposed downstream of a primary fan as discussed above. Further, the mid-fan arrangement 301 provides flow to a third stream arrangement, shown in FIG. 4 as a fan duct 372, which may be bounded by a fan cowl 370. The mid-fan arrangement 301 is further configured to provide flow to a turbomachine 320 through a core duct 342. Flow from the secondary fan assembly 387 disposed in the inlet duct 380 is split between the core duct 342 and the fan duct 372 by a splitter or leading edge 344 disposed in the inlet duct 380. As shown in FIG. 4, the leading edge (also interchangeably referred to as the splitter) 344 may be defined as part of a core cowl 322. As will be discussed in greater detail below with reference to FIG. 7, various features may be implemented to control flow split from the inlet duct 380 into the core duct 342 and into the fan duct 372.

The secondary fan assembly 387 of FIG. 4 includes the first secondary fan 318 and the second secondary fan 319. However, it should be appreciated that any number of secondary fans may be provided. As shown, the first secondary fan 318 and the second secondary fan 319 are adjacently arranged. The first secondary fan 318 in this embodiment is configured to rotate in a first rotational direction, for example in the indicated circumferential direction C, and the second secondary fan 319 is configured to rotate in a second rotational direction opposite the first rotational direction, for example opposite the indicated circumferential direction C. In the depicted embodiment, the first secondary fan 318 is disposed upstream of the second secondary fan 319 and is drivingly coupled to and driven by the turbomachine 320 in the first rotational direction. The second secondary fan 319 is disposed downstream of the first secondary fan 318 and is drivingly coupled to and driven by the turbomachine 320 in the second rotational direction opposite the first rotational direction.

As above, the first secondary fan 318 and the second secondary fan 319 in FIG. 4 are adjacently arranged such that no aerodynamic turning surface is disposed therebetween. It should be appreciated that support structures such as various frames (not shown) may be provided between the first secondary fan 318 and the second secondary fan 319 as required. However, even in such an embodiment, greater compactness can be achieved than when aerodynamic turning surfaces are required.

In the embodiment shown in FIG. 4, no structure is disposed between the first secondary fan 318 and the second secondary fan 319 in the depicted section. Across the circumference of the secondary fan assembly 387, no structure is disposed between the first secondary fan 318 and the second secondary fan 319 in at least certain radial positions. That is, in the depicted embodiment, it should be appreciated that no structure separates the first secondary fan 318 from the second secondary fan 319 across the entire overlapping radial extent. It should be appreciated that the radial extents, including the tip radii and hub radii as described in greater detail above with reference to FIGS. 1 and 2, may be the same or different between the first secondary fan 318 and the second secondary fan 319.

As noted above, each of the first secondary fan 318 and the second secondary fan 319 may be driven by the turbomachine 320. As described in greater detail with reference to FIG. 1 above, the turbomachine 320 includes a compressor section 312, a combustor section 314, and a turbine section 316. The turbine section 316, shown here as including a first turbine 332 and a second turbine 334, is configured to drive the compressor section 312, shown here as including a first compressor 325. The combustor section 314 includes a combustor 330 configured to ignite a fuel mixture and drive the turbine section 316.

The turbomachine 320 depicted includes a first shaft 328 configured to drive the first secondary fan 318 and a second shaft 329 configured to drive the second secondary fan 319. As above, the first secondary fan 318 and the second secondary fan 319 are configured to operate in opposite rotational directions. Accordingly, the first shaft 328 and the second shaft 329 may also be configured to operate in opposite rotational directions. Of course, it should be appreciated that the first shaft 328 and the second shaft 329 may operate in the same rotational direction and still drive the first secondary fan 318 and the second secondary fan 319 in opposite rotational directions, for example through the use of gearing.

In the embodiment of FIG. 4, the first shaft 328 is driven by the second turbine 334 in the first rotational direction. The second turbine 334 may also be referred to as a high pressure turbine as described in greater detail above with reference to FIG. 1. The first shaft 328 is further connected to the first secondary fan 318 with a first fan connection 321. The first fan connection may be a geared or direct connection, for example with blades of the first secondary fan 318 attached directly to the first shaft 328 or an intermediate component (not shown) attached directly thereto. In such a configuration, complexity, weight, and size can be reduced by arranging the first shaft 328 and its associated driven and driving components to attach directly thereto, for example without any intermediate speed reduction or other gearing. The first shaft 328 may also be configured to drive a primary fan (not shown, see fan section 150 of FIG. 1 and rotor 502 of FIGS. 8-11).

Still referring to FIG. 4, the second shaft 329 is driven by the first turbine 332, which may also be referred to as a low pressure turbine as described in greater detail above with reference to FIG. 1. The second shaft 329 is attached to the second secondary fan 319 with a second fan connection 323. As with the first fan connection 321 described above, the second fan connection 323 may be a geared or direct connection, for example with blades of the second secondary fan 313 attached directly to the second shaft 329 or an intermediate component (not shown) attached directly thereto. The second shaft 329 may also be configured to drive at least part of the compressor section 312, such as the first compressor 325 as shown. As shown in this embodiment, the second shaft 329 may also be referred to as a high speed shaft or high speed spool and the first shaft 328 may also be referred to as a low speed shaft or a low speed spool.

In the embodiment of FIG. 4, the first shaft 328 and the second shaft 329 may be disposed with one circumferentially about the other, for example concentrically. As shown, the first shaft 328 is disposed concentrically within the second shaft 329. With the arrangement described above, first shaft 328 may be configured to simply control axially outboard components while the second shaft 329 may be configured to simply control axially inboard components relative to components. This arrangement avoids complex drum arrangements often needed to control rotating components of a turbine engine. Notably, the first shaft 328 may be configured so as to not drive any part of the turbomachine 320, such as a part of the compressor section 312, thus maintaining this noted arrangement.

Still referring to FIG. 4, the turbine section 316 of the turbomachine 320 may be configured for adjacent counter-rotation, for example with no aerodynamic turning surface disposed between the first turbine 332 and the second turbine 334. It should be appreciated that a support structure (not shown) may still be provided between the first turbine 332 and the second turbine 334. However, even in such an embodiment, greater compactness can be achieved than when aerodynamic turning surfaces are required.

In the embodiment shown in FIG. 4, no structure is disposed between the first turbine 332 and the second turbine 334 in the depicted section. Across the circumference of the turbine section 316, no structure is disposed between the first turbine 332 and the second turbine 334 in at least certain radial positions. That is, in the depicted embodiment, it should be appreciated that no structure separates the first turbine 332 from the second turbine 334 across the entire overlapping radial extent.

Figure 5:
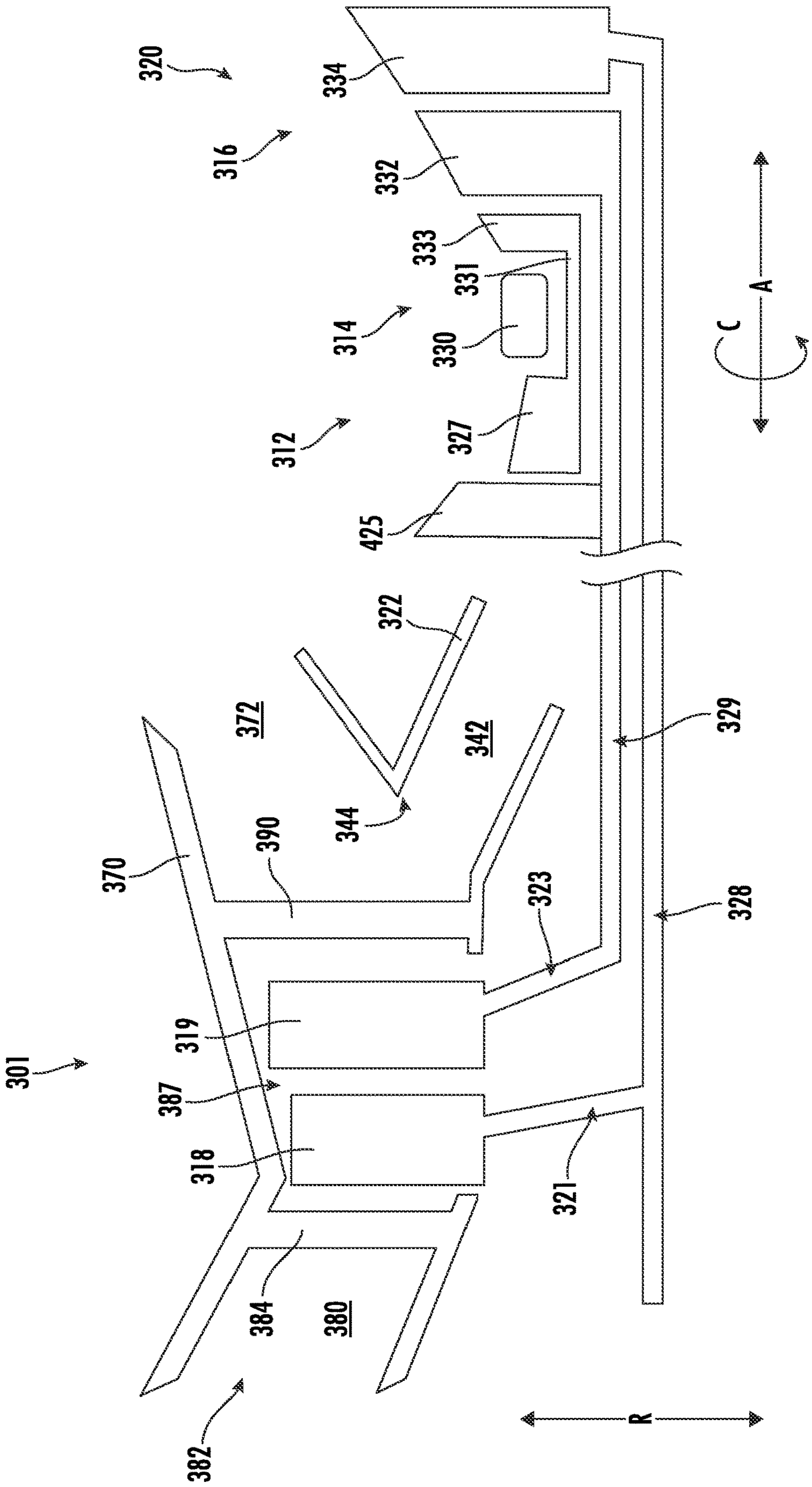
FIG. 5 is a schematic sectional view of a mid-fan arrangement for a three-stream engine according to another embodiment.

Referring now to FIG. 5 a schematic sectional view of a mid-fan arrangement 301 for a three-stream engine is depicted according to another embodiment. The embodiment of FIG. 5 differs from that of FIG. 4 in arrangement of the turbomachine 320. As shown in FIG. 5 a third shaft 331 (also referred to as a third spool) is provided. The third shaft 331 may be arranged circumferentially about the first shaft 328 and the second shaft 329 as described above. For example, each of the first shaft 328, the second shaft 329, and the third shaft may be concentrically arranged relative to one another.

As depicted in FIG. 5, the third shaft 331 is connected to a third spool turbine 333 and a second compressor 327 (also referred to as a third spool compressor). This arrangement may be employed to provide a second compressor 327 (further referred to as a high pressure compressor) while maintaining a simple concentric spool arrangement as described above with reference to FIG. 4. For example, all components driven or driving the third shaft 331 may be disposed axially inboard of all components driven or driving the second shaft 329, which in turn may have all of its driven or driving components axially inboard of all driven or driving components of the first shaft 328. To state this another way, each driven component of the first shaft 328 may be disposed upstream of all components of the second shaft 329 and the third shaft 331; each driven component of the second shaft 329 may be disposed upstream of all components of the third shaft 331; all driving components of the third shaft 331 may be disposed upstream of all driving components of the second shaft 329 and the first shaft 328, and all driving components of the second shaft 329 may be disposed upstream of all driving components of the first shaft 328.

The embodiment of FIG. 5 further facilitates the inclusion of a first compressor 425 (in this embodiment also referred to as a low pressure compressor). Accordingly, a high pressure compressor 327 and a low pressure compressor 425 may be driven with a concentric arrangement as described just above while still employing the described secondary fan assembly 387 to feed a third stream architecture.

Figure 6:
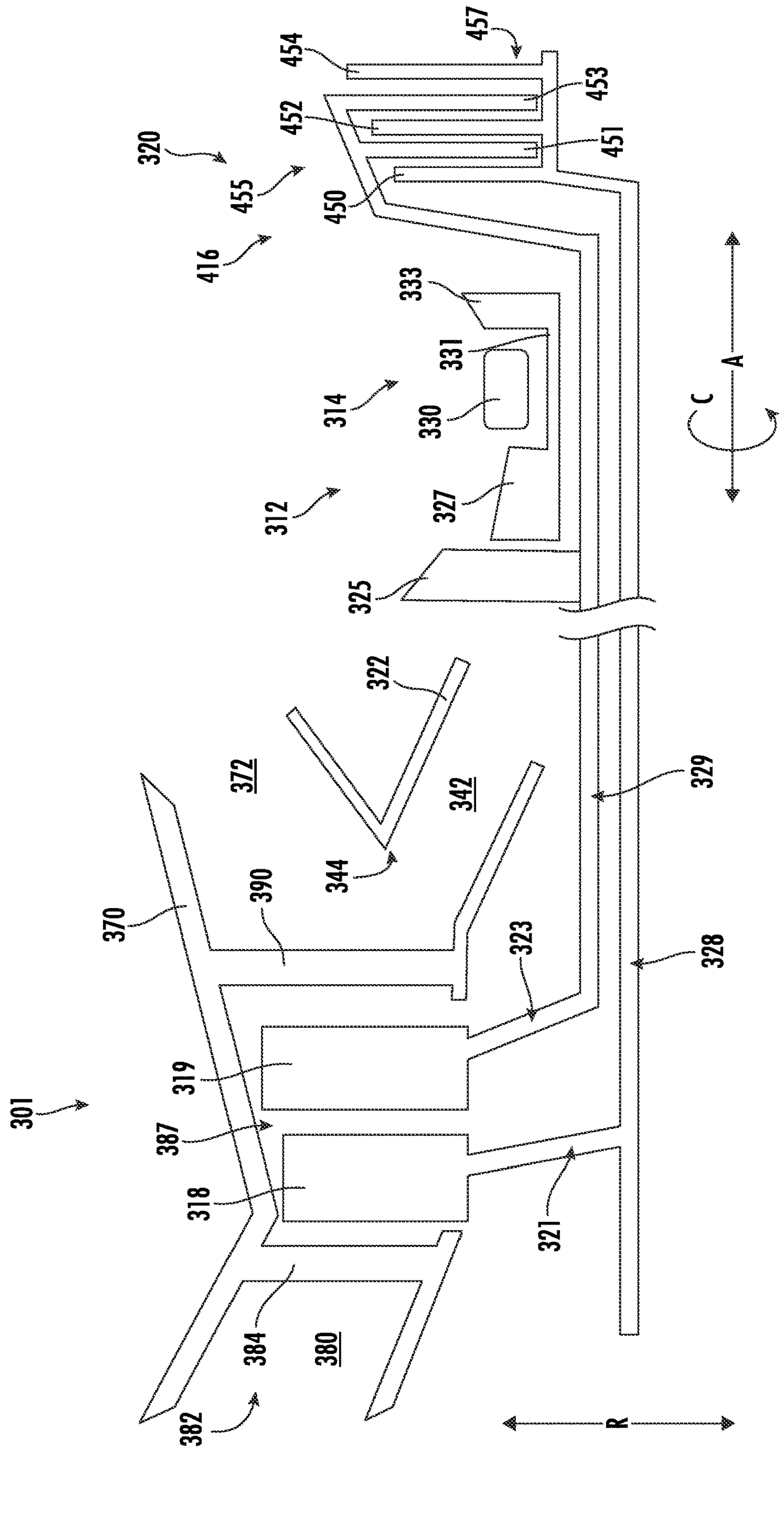
FIG. 6 is a schematic sectional view of a mid-fan arrangement for a three-stream engine according to yet another embodiment.

Turning now to FIG. 6, a schematic sectional view of a mid-fan arrangement 301 for a three-stream engine according to yet another embodiment is depicted. The embodiment of FIG. 6 differs from that of FIG. 5 in that it includes a turbine assembly 466 configured as an interdigitated turbine assembly. Such an interdigitated turbine assembly 466 may include various features such as those described in U.S. patent application Ser. No. 15/412,175 (Published as U.S. Patent Application Publication No. 2018/0209336, issued as U.S. Pat. No. 10,544,734), filed Jan. 23, 2017, which is incorporated by reference herein in its entirety.

As shown, the embodiment of FIG. 6 includes a first interdigitated stage 450, a third interdigitated stage 452, and a fifth interdigitated stage 454, which collectively may be referred to as a second shaft turbine section 455 associated with the first shaft 328 A second interdigitated stage 451 and fourth interdigitated stage 453 are associated with the second shaft 329 and may be collectively referred to as a first shaft turbine section 457. As described above with reference to FIGS. 4 and 5, the first shaft turbine section 457 and the second shaft turbine section 455 are configured to counter rotate as to drive the counter rotating secondary fan assembly 387. This configuration may be referred to as a vaneless counter rotating turbine assembly. As described above, individual stages of the vaneless counter rotating turbine assembly may be similarly adjacently arranged as with the first and second turbines 332, 334.

Figure 7:
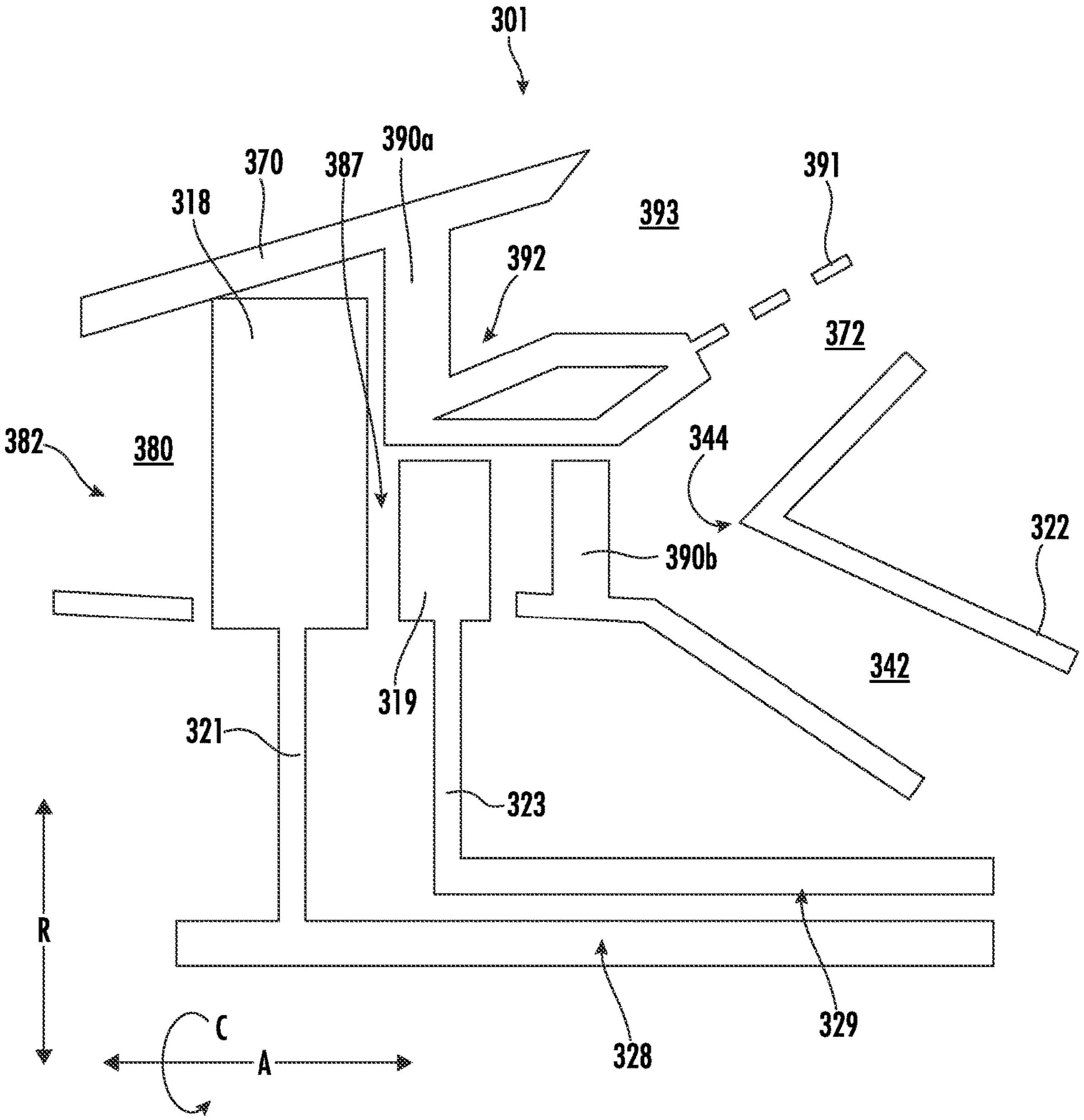
FIG. 7 is a close-up, schematic sectional view of another embodiment of a mid-fan arrangement for a three-stream engine.

Turning now to FIG. 7, a close-up, schematic sectional view of another embodiment of a mid-fan arrangement 301 for a three-stream engine is provided. The embodiment of FIG. 7 could be applied to various embodiments of mid-fan arrangements as described herein with reference to FIGS. 4-6 and to various engine configurations as described with reference to FIGS. 8-11. The embodiment of FIG. 7 depicts a difference in tip radius of the first secondary fan 318 and the second secondary fan 319 (see FIG. 2). As described in greater detail above, the various radii of individual secondary fans 318, 319 may be adjusted to meet different criteria. As shown in FIG. 7, the embodiment where the first secondary fan 318 has a greater tip radius than the second secondary fan 319 facilitates individual flow by the first secondary fan 318. As described above, the first secondary fan 318 may be drivable with the primary fan (not shown) and may thus be configured to provide relatively low speed rotation and relatively high thrust. As shown in FIG. 7, the first secondary fan 318 provides at least part of its downstream flow directly to a mixer duct 393 through a mixer duct inlet 392. The mixer duct 393 may be considered part of the third stream or may directly feed the third stream without feeding the turbomachine (not shown). A plurality of first outlet guide vanes 390*a* may individually control flow from this radially outer portion of the first secondary fan 318. It should be appreciated that this flow from the radially outer portion of the first secondary fan 318 and other flows may be controlled by various other features, include downstream volume or nozzle control in conjunction with or as an alternative to the plurality of first outlet guide vanes 390*a*.

Still referring to FIG. 7, the second secondary fan 319 and the first secondary fan 318 may together provide flow through the inlet duct 380 to the core duct 342 and the fan duct 372. As shown, this flow may be controlled by a plurality of second outlet guide vanes 390*b*. The first outlet guide vanes 390*a* and the second outlet guide vanes 390*b* may be controlled individually or in combination with one another, for example to control a proportion of flow between the fan duct 372 and the core duct 342. Further control may also be provided, for example with a variable mixer control configured to regulate flow through the fan duct 372. In various embodiments, the first outlet guide vanes 390*a* may be referred to as a first variable mixer control and the second outlet guide vanes 390*b* may be referred to as a second variable mixer control.

The variable mixer control may additionally or alternatively have any suitable structure for varying an amount of airflow allowable, e.g., into the fan duct 372. For example, the variable mixer control may include a blocker door 391, depicted in phantom, configured to pivot into the mixer duct 393 to partially close off the mixer duct 393, into the fan duct 372, or both.

As shown in FIG. 7, while the entire secondary fan assembly 387 may be disposed within the inlet duct 380 and upstream of the leading edge 344, one or more portions of the secondary fan assembly 387 may be disposed downstream of one or more inlets or flow paths, such as the mixer duct inlet 392. This configuration may facilitate compactness in axial extent while maintaining the discussed advantages of a mid-fan arrangement 301 as described herein.

Turning now to FIGS. 8-11, each of the gas turbine engines of FIGS. 8 through 11 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 8 through 11 each also include a ducted mid-fan or secondary fan assembly including a first secondary fan 518 and a second secondary fan 519. The gas turbine engines each include a fan cowl 520 surrounding the first secondary fan 518 and the second secondary fan 519. It should be appreciated that the features as described above with reference to the secondary fan assemblies in FIGS. 1, 2, and 4-7 may be applied across each of the embodiments of FIGS. 8-11 as described herein.

Referring still to the gas turbine engines of FIGS. 8 through 11, the gas turbine engines each also define a bypass passage 522 downstream of the respective rotor 502 and over the respective fan cowl 520 and core cowl 510, and further define a third stream 524 extending from a location downstream of the respective first secondary fan 518 and second secondary fan 519 to the respective bypass passage 522 (at least in the embodiments depicted; in other embodiments, the third stream 524 may instead extend to a location downstream of the bypass passage 522).

Figure 8:
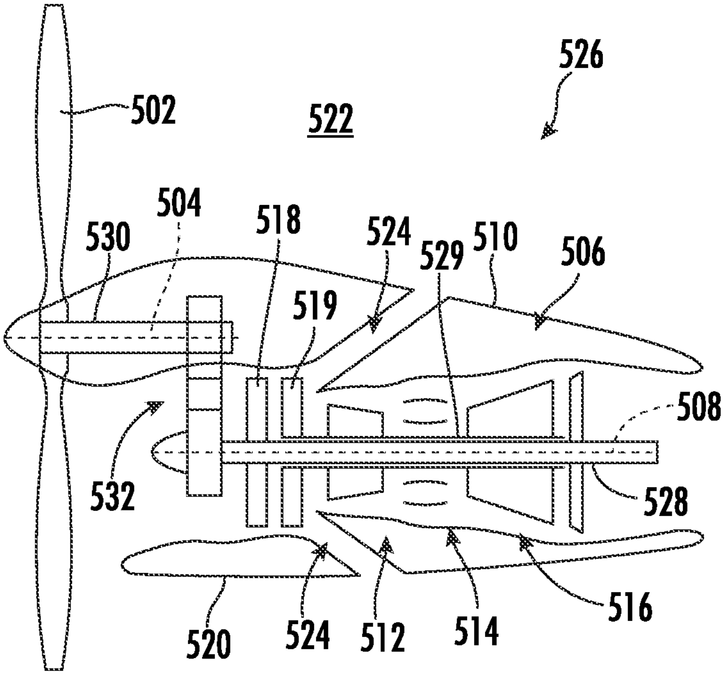
FIG. 8 is a schematic view of a turboprop engine in accordance with an exemplary aspect of the present disclosure.

Referring particularly to FIG. 8, the exemplary gas turbine engine depicted is configured as a turboprop engine 526. In such a manner, the rotor 502 (or primary fan) is configured as a propeller, defining a relatively large diameter. Further, the turboprop engine 526 includes a first engine shaft 528 and a second engine shaft 529 driven by the turbomachine 506, a fan shaft 530 rotatable with the rotor 502, and a gearbox 532 mechanically coupling the first engine shaft 528 with the fan shaft 530. The gearbox 532 is an offset gearbox such that the rotor axis 504 is radially offset from the longitudinal axis 508 of the turboprop engine 526. As shown, the first engine shaft 528 may be concentrically disposed within the second engine shaft 529, where the first engine shaft 528 further drives the first secondary fan 518 and the second engine shaft 529 drives the second secondary fan 519

Notably, in other embodiments of the present disclosure, a turboprop engine may be provided with a reverse flow combustor.

Figure 9:
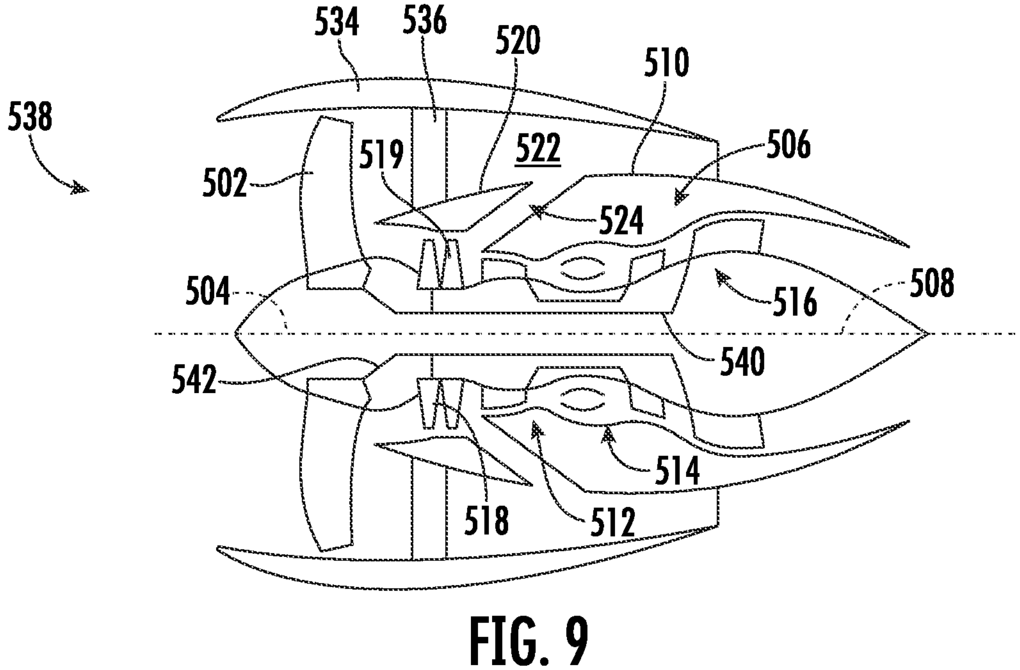
FIG. 9 is a schematic view of a direct drive, ducted, turbofan engine in accordance with an exemplary aspect of the present disclosure.
Figure 10:
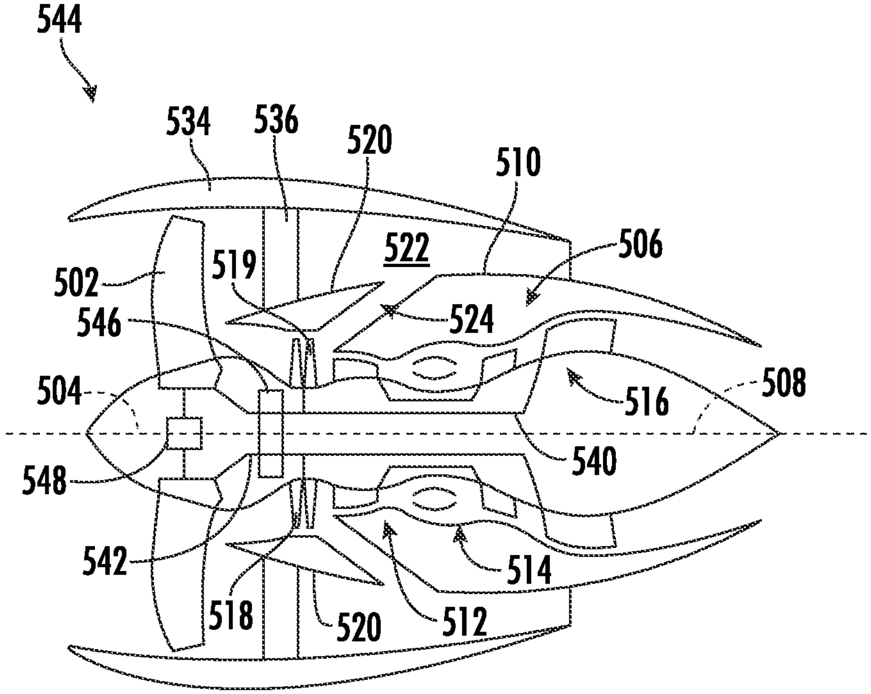
FIG. 10 is a schematic view of a geared, ducted, turbofan engine in accordance with an exemplary aspect of the present disclosure.
Figure 11:
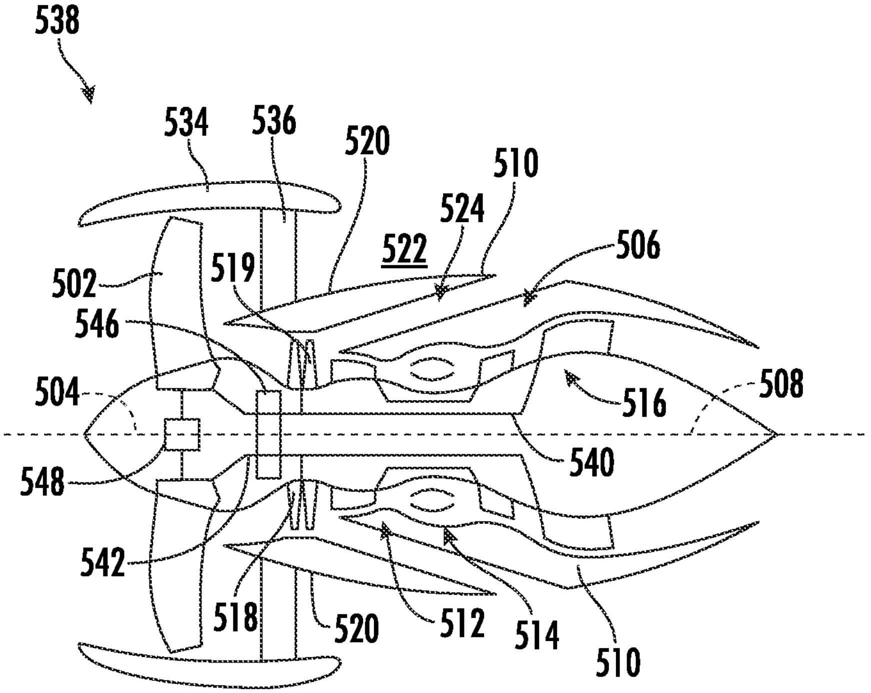
FIG. 11 is a schematic view of a geared, ducted, turbofan engine in accordance with another exemplary aspect of the present disclosure.

Referring to FIGS. 9 through 11, the gas turbine engines are each configured as turbofan engines, and more specifically as ducted turbofan engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 9 is configured as a direct drive, ducted, turbofan engine 538. In particular, the direct drive, ducted, turbofan engine 538 includes an engine shaft 540 driven by the turbine section 516 and a fan shaft 542 rotatable with the rotor 502. The fan shaft 542 is configured to rotate directly with (i.e., at the same speed as) the engine shaft 540. The fan shaft 542 is further configured to rotate with the first secondary fan 518, and may or may not be geared in relation thereto as described in greater detail below. It should generally be understood that the fan shaft 542 may be connected directly to the first secondary fan 518 and the engine shaft 540 may be directly connected to the second secondary fan 519.

By contrast, the gas turbine engine of FIG. 10 is configured as a geared, ducted, turbofan engine 544. In particular, the geared, ducted, turbofan engine 544 includes the engine shaft 540 driven by the turbine section 516 and the fan shaft 542 rotatable with the rotor 502. However, the exemplary geared, ducted, turbofan engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the second secondary fan 519.

Notably, the exemplary geared, ducted, turbofan engine 544 of FIG. 10 further includes a pitch change mechanism 548 operable with the rotor 502 to change a pitch of the rotor blades of the rotor 502. Such may allow for an increased efficiency of the gas turbine engine.

Further, the exemplary gas turbine engine of FIG. 11 is again configured as a direct drive, ducted, turbofan engine 538. However, by contrast to the embodiment of FIG. 9 where a fan duct outlet defined by the fan duct is upstream of a bypass passage outlet defined by the bypass passage 522, in the embodiment of FIG. 11, the fan duct outlet defined by the fan duct is downstream of the bypass passage outlet defined by the bypass passage 522.

Generally, a turbofan engine includes a fan to provide a desired amount of thrust without overloading the fan blades (i.e., without increasing a disk loading of the fan blades of the fan beyond a certain threshold), and therefore to maintain a desired overall propulsive efficiency for the turbofan engine. Conventional turbofan engine design practice has been to provide an outer nacelle surrounding the fan to provide relatively efficient thrust for the turbofan engine. Such a configuration may generally limit a permissible size of the fan (i.e., a diameter of the fan). However, the inventors of the present disclosure have found that turbofan engine design is now driving the diameter of the fan higher to provide as much thrust for the turbofan engine as possible from the fan to improve an overall propulsive efficiency of the turbofan engine.

By increasing the fan diameter, an installation of the turbofan engine becomes more difficult. In addition, if an outer nacelle is maintained, the outer nacelle may become weight prohibitive with some larger diameter fans. Further, as the need for turbofan engines to provide more thrust continues, the thermal demands on the turbofan engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficiently for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc. during the design of several different types of gas turbine engines, including the gas turbine engines described above with reference to FIGS. 1 through 11. During the course of this practice of studying/evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit also avoids late-stage redesign.

The desired relationships providing for the improved gas turbine engine, discovered by the inventors, are expressed as:

$$\mathrm{TPAR}=(A_B+A_{3S})/A_C \quad (1)$$

$$\mathrm{CBR}=A_{3S}/A_C \quad (2)$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters representing influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

In certain embodiments of the present disclosure, the relationships among the various physical properties of a gas turbine engine represented in Expressions (1) and (2) are understood as applicable to one or more of the variety of engine configurations previously discussed. Specifically, Table 1 highlights preferred subranges, including subranges suitable for unducted engines, ducted engines, and turboprop engines.

In certain embodiments of the present disclosure, a first range and a second range are provided. The exemplary embodiments include unducted turbofan engines, ducted turbofan engines, and turboprop engines. The first range corresponds to a TPAR between 3.5 and 100 and a CBR between 0.1 and 10. The first range captures the benefits of the present disclosure across the variety of engine types. The second range corresponds to a TPAR between 4 and 75 and a CBR between 0.3 and 5. The second range may provide more desirable TPAR and CBR relationships across the variety of engine types to achieve propulsive efficiency, while still providing packaging and weight benefits, thermal benefits, etc.

In certain embodiments of the present disclosure, a third range and a fourth range are provided. The exemplary embodiments include a variety of gas turbine engines having an unducted primary fan, similar to the embodiments described previously with reference to FIGS. 1 through 7. The third range corresponds to a TPAR between 30 and 56 and a CBR between 0.3 and 5. The third range captures the benefits of the present disclosure for unducted gas turbine engines. The fourth range corresponds to a TPAR between 35 and 50 and a CBR between 0.5 and 3. The fourth range may provide more desirable TPAR and CBR relationships for the unducted gas turbine engines to achieve propulsive efficiency, while still providing packaging and weight benefits, thermal benefits, etc.

As will be appreciated, the unducted gas turbine engines may have, on the whole, a higher TPAR as compared to the ducted gas turbine engines, enabled by a lack of an outer nacelle or other casing surrounding a primary fan. The range of CBR values in the fourth range isn't as large as the range of CBR values in the third range, as in the embodiments with a higher TPAR, the CBR needs to be lower to provide a necessary amount of airflow to a core of the engine without exceeding temperature thresholds or requiring an undesired reduction in a size of the primary fan.

The inventors found that the TPAR values and CBR values in the third and fourth ranges shown may provide a desirable propulsive benefit, while still enabling operation of the core in a reasonable manner, and balancing installation and thermal load considerations.

In certain embodiments of the present disclosure, a fifth range, a sixth range, a seventh range, an eighth range, a ninth range, and a tenth range are provided. The exemplary embodiments include a variety of ducted gas turbine engines in accordance with aspects of the present disclosure. In particular, the exemplary embodiments include a variety of gas turbine engines having a ducted primary fan, similar to the exemplary embodiments described herein with reference to FIGS. 9 through 11. The fifth range corresponds to a TPAR between 3.5 and 40 and a CBR between 0.2 and 5. The fifth range captures the benefits of the present disclosure for ducted gas turbine engines.

The sixth range corresponds to a TPAR between 3.5 and 20 and a CBR between 0.2 and 5. The sixth range captures the benefits of the present disclosure for ducted gas turbine engines in a direct drive configuration (see, e.g., FIG. 9). As will be appreciated, with a ducted, direct drive gas turbine engine a primary fan may be smaller, limiting a TPAR. The seventh range, which also corresponds to ducted gas turbine engines in a direct drive configuration, corresponds to a TPAR between 8 and 15 and a CBR between 0.3 and 1.8, and may represent a more preferrable range.

The eighth range corresponds to a TPAR between 8 and 40 and a CBR between 0.2 and 5. The eighth range captures the benefits of the present disclosure for ducted gas turbine engines in a geared configuration (see, e.g., FIGS. 10 and 11). As will be appreciated, with a ducted, geared gas turbine engine a primary fan may be larger as compared to a ducted, direct drive gas turbine engine, allowing for a larger TPAR. TPAR is, in turn limited by an allowable nacelle drag and fan operability.

The ninth range corresponds to ducted gas turbine engines in a geared configuration having a variable pitch primary fan (see FIGS. 10 and 11) and the tenth range corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The ninth range corresponds to a TPAR between 20 and 35 and a CBR between 0.5 and 3, and the tenth range corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

As will be appreciated, the ducted gas turbine engines may have, on the whole, a lower TPAR than the unducted gas turbine engines as a result of an outer nacelle surrounding a primary fan (the outer nacelle becoming prohibitively heavy with higher diameter primary fans). Further, it will be appreciated that the TPAR values for geared engines may be higher than the TPAR values for direct drive engines, as inclusion of the gearbox allows the primary fan to rotate more slowly than the driving turbine, enabling a comparatively larger primary fan without overloading the primary fan or generating shock losses at a tip of the primary fan. The range of CBR values may generally be relatively high given the relatively low TPAR values (since a relatively high amount of airflow is provided to a secondary fan through an engine inlet when the TPAR values are low), as a necessary amount of airflow to a core of the ducted gas turbine engine may still be provided with a relatively high CBR without exceeding temperature thresholds or requiring a reduction in a size of the primary fan.

The inventors found that the TPAR values and CBR values in the fifth, sixth, seventh, eighth, ninth, and tenth ranges may provide a desirable propulsive benefit, while still enabling operation of the core in a reasonable manner, and balancing installation and thermal load considerations.

In certain embodiments of the present disclosure, an eleventh range and a twelfth range are provided. The exemplary embodiments include a variety of turboprop gas turbine engines in accordance with aspects of the present disclosure. In particular, the exemplary embodiments include a variety of turboprop gas turbine engine similar to the exemplary embodiment described herein with reference to FIG. 8. The eleventh range corresponds to a TPAR between 40 and 100 and a CBR between 0.3 and 5. The eleventh range captures the benefits of the present disclosure for turboprop gas turbine engines. The twelfth range corresponds to a TPAR between 50 and 70 and a CBR between 0.5 and 3, and may represent a more preferrable range.

As will be appreciated, the turboprop gas turbine engines may have, on the whole, higher TPAR values than turbofan engines, enabled by the lack of an outer nacelle or other casing surrounding a primary fan and a relatively slow operational speed of the primary fan and aircraft incorporating the turboprop gas turbine engine. The range of CBR values in the eleventh range and the twelfth range may be relatively small, as less air may be provided through a third stream with such a high TPAR without compromising operation of a core of the gas turbine engine.

The inventors found that the TPAR values and CBR values in the eleventh range and twelfth range may provide a desirable propulsive benefit, while still enabling operation of the core in a reasonable manner, and balancing installation and thermal load considerations.

TABLE 2, below provides a summary of TPAR values and CBR values for various gas turbine engines in accordance with one or more exemplary aspects of the present disclosure.

TABLE 2

| Engine Type | TPAR Value | CBR Value |
|---|---|---|
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |

TABLE 2-continued

| Engine Type | TPAR Value | CBR Value |
|---|---|---|
| Ducted, Direct Drive GTE (lower flight speed) | 8 to 15 | 0.3 to 1.8 |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

For the purposes of Table 2, the term "Ducted" refers to inclusion of an outer nacelle around a primary fan (see, e.g., FIGS. 9 to 11); "Open Rotor" refers to inclusion of an unducted primary fan (see, e.g., FIG. 1); "Geared" refers to inclusion of a reduction gearbox between the primary fan and a driving turbine (see, e.g., FIGS. 10 to 11); "Direct Drive" refers to exclusion of a reduction gearbox between the primary fan and a driving turbine (see, e.g., FIG. 9); "Variable Pitch" refers to inclusion of a pitch change mechanism for changing a pitch of fan blades on a primary fan (see, e.g., FIGS. 1, 10, 11); "Fixed Pitch" refers to exclusion of a pitch change mechanism for changing a pitch of fan blades on a primary fan (see, e.g., FIGS. 8 to 9); "lower flight speed" refers to an engine designed to operate at a flight speed less than 0.85 Mach; and "higher flight speed" refers to an engine designed to operate at a flight speed higher than 0.85 Mach.

It will be appreciated that although the discussion above is generally relating to the open rotor engine 100 described above with reference to FIGS. 1 through 7, in various embodiments of the present disclosure, the relationships outlined above with respect to, e.g., Expressions (1) and (2) may be applied to any other suitable engine architecture, such as the embodiments of FIGS. 8 through 11.

As will be appreciated from the description herein, various embodiments of a gas turbine engine are provided. Certain of these embodiments may be an unducted, single rotor gas turbine engine (see FIGS. 1 and 2), a turboprop engine (see FIG. 8), or a ducted turbofan engine (see FIGS. 9 through 11). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 $hp/ft^2$ and 160 $hp/ft^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

According to a first clause, a gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan drivingly coupled to the turbomachine; and a secondary fan assembly disposed downstream of the primary fan within the inlet duct, wherein the secondary fan assembly comprises: a first secondary fan drivingly coupled to the turbomachine in a first rotational direction; and a second secondary fan drivingly coupled to the turbomachine in a second rotational direction opposite the first rotational direction.

The gas turbine engine of the preceding clause, wherein the inlet duct comprises a splitter separating the fan duct inlet from the core inlet, wherein the splitter is disposed downstream of the secondary fan assembly.

The gas turbine engine of any of the preceding clauses, further comprising a core cowl enclosing at least a portion of the turbomachine, the core cowl comprising a leading edge that at least in part defines the splitter.

The gas turbine engine of any of the preceding clauses, further comprising: a first shaft drivingly coupled to the turbomachine and driving the first secondary fan in the first rotational direction; and a second shaft drivingly coupled to the turbomachine and driving the second secondary fan in the second rotational direction.

The gas turbine engine of any of the preceding clauses, wherein the first shaft is concentric with the second shaft.

The gas turbine engine of any of the preceding clauses, wherein the first shaft is further configured to drive the primary fan.

The gas turbine engine of any of the preceding clauses, wherein the second shaft is disposed circumferentially about the first shaft.

The gas turbine engine of any of the preceding clauses, further comprising: a third shaft drivingly coupled to a high pressure turbine and a high pressure compressor.

The gas turbine of any of the preceding clauses, wherein the first shaft and the second shaft are each drivingly coupled to a vaneless counter rotating turbine comprising a first plurality of interdigitated stages driving the first shaft and a second plurality of interdigitated stages driving the second shaft.

The gas turbine engine of any of the preceding clauses, wherein the primary fan is an unducted fan.

The gas turbine engine of any of the preceding clauses, wherein the first secondary fan has a greater tip radius than the second secondary fan.

The gas turbine engine of any of the preceding clauses, further comprising a mixer duct inlet to a mixer duct, wherein the first secondary fan is disposed upstream of the mixer duct inlet and the second secondary fan is disposed downstream of the mixer duct inlet.

The gas turbine engine of any of the preceding clauses, further comprising at least one variable mixer control configured to regulate a flow from the first secondary fan and the second secondary fan.

The gas turbine engine of any of the preceding clauses, wherein the at least one variable mixer control comprises: a first variable mixer control configured to regulate the flow from the first secondary fan and the second secondary fan; and a second variable mixer control configured to regulate a flow from only one of the first secondary fan and the second secondary fan.

The gas turbine engine of any of the preceding clauses, wherein at least one of the first secondary fan or the second secondary fan defines a radius ratio of between 0.2 to 0.9.

The gas turbine engine of any of the preceding clauses, wherein the first secondary fan and the second secondary fan are adjacently arranged such that no aerodynamic turning surface is disposed therebetween.

The gas turbine engine of any of the preceding clauses, wherein in at least one radial position of the first secondary fan and the second secondary fan, no structure is disposed therebetween.

The gas turbine engine of any of the preceding clauses, wherein the turbine section of the turbomachine comprises a first turbine stage and a second turbine stage arranged adjacently such that no aerodynamic turning surface is disposed therebetween.

The gas turbine engine of any of the preceding clauses, wherein the first turbine stage drives the first secondary fan in the first rotational direction and the second turbine stage drives the second secondary fan in the second rotational direction.

The gas turbine engine of any of the preceding clauses, wherein the primary fan and at least one of the first secondary fan or the second secondary fan define a tip radius ratio of between 2 to 10.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; and a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct.

The gas turbine engine of any preceding clause, wherein the thrust to power airflow ratio and the core bypass ratio are defined when the gas turbine engine is operated at a rated speed during standard day operating conditions.

The gas turbine engine of any preceding clause, wherein the thrust to power airflow ratio between 4 and 75.

The gas turbine engine of any preceding clause, wherein the primary fan is an unducted primary fan, and wherein the thrust to power airflow ratio between 30 and 60.

The gas turbine engine of any preceding clause, wherein the thrust to power airflow ratio between 35 and 50.

The gas turbine engine of any preceding clause, wherein the core bypass ratio between 0.3 and 5.

The gas turbine engine of any preceding clause, wherein the gas turbine engine is a turboprop engine, and wherein the thrust to power airflow ratio between 40 and 100.

The gas turbine engine of any preceding clause, wherein the primary fan is a ducted primary fan, and wherein the thrust to power airflow ratio is between 3.5 and 40.

The gas turbine engine of any preceding clause, wherein the gas turbine engine is a direct drive gas turbine engine, and wherein the thrust to power airflow ratio is between 3.5 and 20.

The gas turbine engine of any preceding clause, wherein the gas turbine engine is a geared gas turbine engine, and wherein the thrust to power airflow ratio is between 8 and 40.

The gas turbine engine of any preceding clause, wherein the secondary fan is a single stage secondary fan.

The gas turbine engine of any preceding clause, wherein the secondary fan is a multi-stage secondary fan.

The gas turbine engine of any preceding clause, wherein the multi-stage secondary fan is a two stage secondary fan.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is downstream of the bypass passage outlet.

The gas turbine engine of any preceding clause, wherein the primary fan is a ducted primary fan comprising an outer nacelle surrounding the primary fan and defining the bypass passage downstream of the primary fan and over the turbomachine, wherein the gas turbine engine further defines a bypass passage outlet at a downstream end of the outer nacelle, wherein the fan duct defines a fan duct outlet, and wherein the fan duct outlet is upstream of the bypass passage outlet.

A method of operating a gas turbine engine, comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct.

The method of any preceding clause, wherein The gas turbine engine of claim 1, wherein the thrust to power airflow ratio between 4 and 75.

The method of any preceding clause, wherein the primary fan is an unducted primary fan, and wherein the thrust to power airflow ratio between 30 and 60.

The method of any preceding clause, wherein the thrust to power airflow ratio between 35 and 50.

The method of any preceding clause, wherein the core bypass ratio between 0.3 and 5.

We claim:

1. A gas turbine engine defining a radial direction and a longitudinal centerline comprising:
- a turbomachine comprising a compressor section, a combustion section, and a turbine section arranged in serial flow order, the turbomachine defining an engine inlet to an inlet duct, a fan duct inlet to a fan duct, and a core inlet to a core duct;
- a primary fan drivingly coupled to the turbomachine, wherein the primary fan is unducted;
- a secondary fan assembly disposed downstream of the primary fan within the inlet duct, wherein the secondary fan assembly comprises:
  - a first secondary fan drivingly coupled to the turbomachine in a first rotational direction, each blade of the first secondary fan including a first root proximate to the longitudinal centerline and a first tip opposite the first root; and
  - a second secondary fan drivingly coupled to the turbomachine in a second rotational direction opposite the first rotational direction, each blade of the second secondary fan including a second root proximate to the longitudinal centerline and a second tip opposite the second root;
  - wherein each blade of the first secondary fan is drivingly coupled to the turbomachine via the first root, and each blade of the second secondary fan is drivingly coupled to the turbomachine via the second root;
  - wherein the first secondary fan is the most upstream fan of the secondary fan assembly; and
  - wherein the second secondary fan is adjacent the first secondary fan such that no aerodynamic turning surface is disposed therebetween;
- a first shaft drivingly coupled to the turbomachine and driving the first secondary fan in the first rotational direction;
- a second shaft drivingly coupled to the turbomachine and driving the second secondary fan in the second rotational direction; and
- a third shaft drivingly coupled to a high pressure turbine and a high pressure compressor;
- wherein the first shaft, the second shaft, and the third shaft are concentrically arranged.

2. The gas turbine engine of claim 1, wherein the inlet duct comprises a splitter separating the fan duct inlet from the core inlet, wherein the splitter is disposed downstream of the secondary fan assembly.

3. The gas turbine engine of claim 2, further comprising a core cowl enclosing at least a portion of the turbomachine, the core cowl comprising a leading edge that at least in part defines the splitter.

4. The gas turbine engine of claim 1, wherein the first shaft is further configured to drive the primary fan.

5. The gas turbine engine of claim 4, wherein the second shaft is disposed circumferentially about the first shaft.

6. The gas turbine engine of claim 1, wherein each of the first shaft and the second shaft is drivingly coupled to a vaneless counter rotating turbine in the turbine section comprising a first plurality of interdigitated stages driving the first shaft and a second plurality of interdigitated stages driving the second shaft.

7. The gas turbine engine of claim 1, further comprising a mixer duct inlet to a mixer duct, wherein the first secondary fan is disposed upstream of the mixer duct inlet and the second secondary fan is disposed downstream of the mixer duct inlet.

8. The gas turbine engine of claim 7, further comprising at least one variable mixer control configured to regulate a flow from the first secondary fan and the second secondary fan.

9. The gas turbine engine of claim 1, wherein at least one blade of the first secondary fan or the second secondary fan defines a radius ratio of 0.2 to 0.9.

10. The gas turbine engine of claim 1, wherein the turbine section of the turbomachine comprises a first turbine stage and a second turbine stage arranged adjacently such that no stator vane is disposed therebetween.

11. The gas turbine engine of claim 10, wherein the first turbine stage drives the first secondary fan in the first rotational direction and the second turbine stage drives the second secondary fan in the second rotational direction.

12. The gas turbine engine of claim 1, wherein a ratio of a tip radius for the primary fan to at least one of a tip radius of at least one blade of the first secondary fan or a tip radius of at least one blade of the second secondary fan is 2 to 10.

13. The gas turbine engine of claim 1, wherein the first secondary fan comprises a single stage of first secondary fan blades, and wherein the second secondary fan comprises a single stage of second secondary fan blades.

* * * * *